Patented Nov. 20, 1934

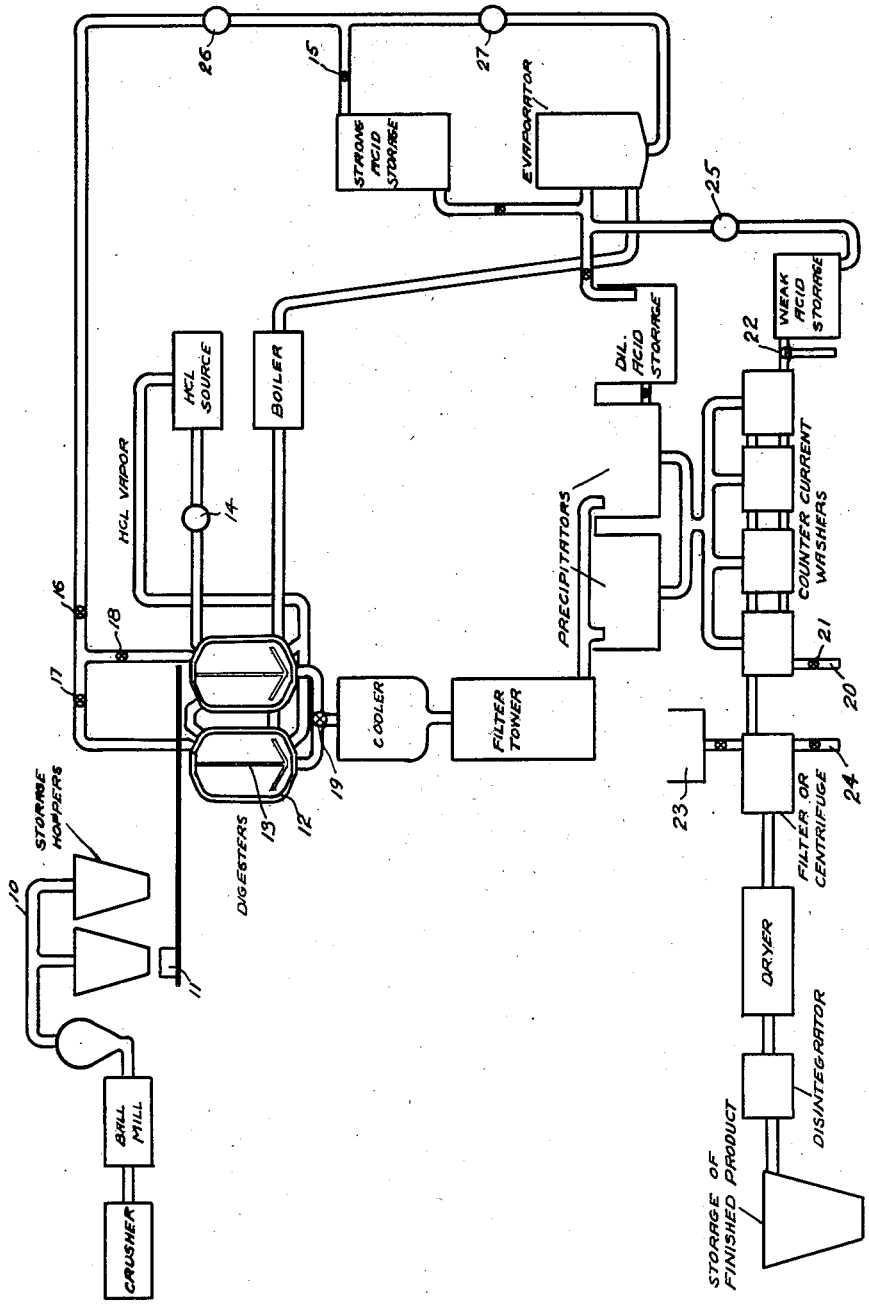

1,981,094

UNITED STATES PATENT OFFICE 1,981,094

PROCESS FOR THE PRODUCTION OF BARIUM SULPHATE

Alexander L. Duval d'Adrian, Alton, Ill., assignor to Ingram & Duval, Inc., Baltimore, Md., a corporation of Maryland Application May 18, 1931, Serial No. 538,189

14 Claims. (Cl. 23—122)

This invention relates to a process for making precipitated mineral pigments and like materials, and more particularly to an improved process for producing mineral pigments of a very high degree of purity, the process being particularly applicable to the production of a very finely divided barium sulphate, the purity thereof when produced according to the present process being such as to enable its use for any of the manifold prevailing purposes in the chemical industries.

An object of the present invention, generally stated, is the attainment of an improved process for producing barium sulphate or similar materials, at much less expense than is involved in prevailing commercial processes utilized for producing similar substances.

A further object is attained in a process for obtaining precipitated minerals in a form substantially free of occluded or accompanying impurities, which process lends itself to the production of substantially chemically pure grades of precipitated mineral products at a cost substantially less than that incident to the production of impure products according to older methods.

Still further objects of the invention may be mentioned as improved provisions for the recovery of solvent materials employed in the process; improvements in the steps of obtaining precipitation of the desired end products, while preventing the precipitation of undesirable impurities therewith; an improved arrangement whereby excessive heating effects due to the use of strong acids may be avoided or minimized; improved means for maintaining a desirable, predetermined temperature in portions of the system devoted to the solution of crude mineral substances, such as crude barytes, and an improved arrangement of portions of the apparatus employed, which tends toward economies in movement of liquids and gases employed in the process, together with economies in the amounts of such substances requisite to the production of a given tonnage of finished product.

The foregoing, as well as a number of additional objects will be apparent from the following detailed description of my improved process, considered in connection with the accompanying drawing, which is in the nature of a diagrammatic representation, or flow sheet, of apparatus preferably employed, illustrating its relation in a system as employed for the production of a pure precipitated form of barium sulphate or blanc fixe.

As typifying the heretofore prevailing methods of making precipitated barium sulphate, an oftenused process consists briefly, in mixing crude mineral barytes with a finely divided carbon, such as coal, the mixture then being raised to a high temperature in a retort, rotary furnace or crucible with the result that the barium sulphate content of the mixture is reduced to barium sulphide. The sulphide is then converted into a solution of barium chloride which is, in turn, treated with sulphuric acid, resulting in the precipitation of barium sulphate. An alternative, prevailing process consists in the reduction, as aforesaid, of the barium sulphate to barium sulphide, which is then usually treated with carbonic acid solution, which results in barium carbonate. The carbonate is then, in turn, treated with sulphuric acid or with sodium sulphate, for the purpose of precipitating the barium as sulphate.

Either of the processes above described is an expensive one and rarely produces an end product of satisfactory purity. The chief factors of expense in these heretofore prevailing methods, may be said to be due to the high temperature necessary in the initial reduction of barium sulphate to barium sulphide, and the large quantities of sulphuric acid heretofore required in carrying out the process. It may be stated as a further object of the present invention to eliminate these items of great expense, while at the same time producing a product of superior purity and physical characteristics.

According to present preference my improved process consists first in crushing to a requisite degree of fineness the mineral barytes, from which the precipitated barium sulphate is to be derived, in a suitable crusher which may be any of a number of well known types, and the effect of which may be supplemented by a ball mill from which, after the grinding and sizing steps are completed, the material is preferably conveyed, by any suitable form of mechanical or other conveyor, to storage hoppers, the path of travel of the material to the hoppers being indicated at 10 in the drawing. From the storage hoppers the material may be conveyed in any suitable manner, as by a transfer car or boshe 11, to a location above one or more digesters, each of which is, by preference, provided with a steam jacket 12, connected to be supplied from a suitable source of steam under pressure such as a boiler or steam generator. The digesters are each provided, according to the drawing, with a suitable agitator 13, which may be mechanically operated in a manner well known in the art. The process of digesting the crude mineral, such as barytes, consists in the introduction, to the digesters, of the ground mineral, together with a suitable quantity of strong sulphuric acid, preferably of a strength above 96%, and as nearly approaching absolute acid as is practically feasible. The quantity of acid supplied to the digesters is preferably at least sufficient to cover the crushed mineral content thereof. My preference is to maintain the digesters, through the use of a steam generator and jackets 12, at a temperature substantially above the boiling point of water, say substantially 120 degrees C. A temperature of this order is desirable, since any hydrated silica accompanying the barytes, is thus dehydrated and rendered insoluble, while any amorphous silica present will be agglomerated and thus rendered filterable. The heating of the acid and mineral, together with the agitation in the digesters, which may be effected by ebullition and percolation, as well as mechanically, result in a rapid solution of the barium sulphate by the strong hot acid. While the high temperature is not strictly necessary to the success of the process, which can be effected with cold acid, the solubility of barium sulphate is very materially increased by digestion at a substantial temperature.

In the course of the digestion or agitation of the barytes and acid it is my preference to introduce, from a suitable source, hydrochloric acid vapor, this vapor being circulated in a closed system by means of a pump 14. The HCl vapor circuit includes a suitable vapor conduit from the source into the lower portions of the digesters, thence out from the upper portions of the digesters through the pump, whence it is returned to the source. In this manner the loss of hydrochloric acid, incident to transfer of the solution to later steps of the process, is minimized. While I prefer the addition of hydrochloric acid to the digesters, to facilitate the solution of impurities existing with the mineral barytes, the choice of the added medium will be dependent to a certain extent upon the nature of the impurities existing with the mineral. For example, nitric or other acids, as well as chlorine gas, may be advantageously employed in place of hydrochloric acid, where conditions dictate this practice according to the substances naturally occuring with the barytes.

The strong sulphuric acid is supplied directly to the digesters from a strong-acid storage tank forming part of a closed acid-circulating system hereinafter more fully described. The delivery of the strong acid to the digester may be controlled by valves, suitably disposed in the acid line, suggested convenient locations of the valves being indicated at 15, 16, 17 and 18, and strong-acid pumps being disposed as indicated at 26 and 27, or the tank so located as to cause flow by gravity to the digesters.

It may here be noted that the various fluid conduits and other material conveying means interconnecting the various items of apparatus are indicated diagrammatically by double lines, the acid of course being conducted through acid-proof piping of any suitable known type, and the solid material being conveyed through and between steps of the process by any of a number of suitable forms of conveying apparatus. From the digesters the acid solution of the mineral is conducted, preferably by gravity, and controlled through a valve such as 19, into a cooler, where its temperature is reduced, say to 100 degrees C. The maintenance of a temperature of this order in the cooler, prevents any substantial precipitation of barium sulphate therein and yet serves to permit a desirable reduction in temperature of the solution as it is thence directed, as by gravity, into a filter tower. This device preferably consists of a container in which is disposed a suitable body of asbestos or other acid-proof filtering medium. At this stage the silica, which constitutes one of the objectionable impurities usually occurring in quantity in mineral barytes, having been dehydrated, will become substantially insoluble and will thus be precipitated on, and entrapped in the filtering material whence it may be removed at intervals, depending upon the extent of its accumulation.

From the filter tower the filtered acid may be removed, as by gravity, into one or more precipitators, which may consist of tanks of suitable size and transverse area and in which the acid solution of the barytes is diluted, to a strength of substantially 80% (by weight) $H_2SO_4$, assuming it is desired to precipitate substantially all of the barium sulphate. It may here be noted that while absolute sulphuric acid will dissolve in the neighborhood of 285 grams of barium sulphate per litre of acid, after the acid solution has been diluted to 80% strength, there remains dissolved only one gram of barium sulphate per litre of solution. At this point, viz., during the dilution of the acid, the precipitation is preferably not carried to completion, since this might result in throwing down certain impurities, for example any of the calcium which might be carried through the filter tower. The extent of dilution may be governed by existing economic factors, for example, prevailing fuel or heat costs, and acid costs. Under certain conditions it may be desirable to dilute the concentrated solution from 96%, say to 93% $H_2SO_4$; restoring concentration by the addition of fuming sulphuric or oleum. A dilution, for precipitation, from 96% to 93% $H_2SO_4$ has been found to yield 16%–17% $BaSO_4$ calculated by weight of original solution, while dilution to 80% yields 18%–19% on the same basis.

It will be understood that while dilute sulphuric acid is conveniently employed as a diluent in the precipitators, hydrochloric acid in somewhat dilute liquid, or in vapor form, may successfully be employed in the precipitators. In this case the hydrochloric acid has a tendency further to purify the precipitate, due to the attack of the nascent dry HCl on the impurities, and further by causing a violent movement of HCl gases in and around the precipitated particles, the gases assisting in carrying off any impurities remaining with the precipitate at this point. In case hydrochloric acid is employed as the diluent, recovery thereof as vapor may be effected from the precipitators and evaporators as by a suitable hood (not shown) disposed over each of the precipitators, and the connection (not shown) of such hoods back to the HCl source. A direct return gas connection (not shown) may also, in this case, be made from the evaporator to the HCl source. In lieu of either the sulphuric or hydrochloric acids as diluents in the precipitators, chlorine water may be employed as a means of sufficiently reducing the concentration of the sulphuric solution of the mineral to effect precipitation thereof, the chlorine water being of analogous advantage and purpose in removing traces of remaining impurities from the precipitated barium sulphate.

At this point it may be mentioned that dilution with acids or other solutions, instead of water, results in a reduced rate of precipitation, and hence in a generally larger and more uniform particle size of the precipitated substance. According to this practice, the size and physical character of the precipitated particles may be regulated or controlled by varying the kind and concentration of the diluent, as well as by variation in the rate of dilution of the strong acid solution in the precipitators.

As a means of readily removing the diluted acid from the precipitators, it is my preference to provide a dilute acid storage tank, to which the acid may be transferred from the precipitators, and in which the acid may be reconcentrated, as desired, or removed from time to time for concentration, as hereinafter more fully discussed.

The barium sulphate resulting from precipitation upon dilution of the acid, following its treatment with HCl vapor, together with the digesting and filtration processes, about noted, is of a high degree of purity and practically free of any of the usual substances existing as impurities in the mineral barytes. From the precipitators this sulphate may be removed either mechanically or by gravity, to a series of countercurrent washers, supplied by preference, from a water inlet 20, controlled by a suitable valve 21, and provided with a valved water outlet 22 disposed between the battery of washers and a weak-acid storage tank. As the pure precipitated sulphate is moved through the countercurrent washers, water is supplied thereto from the source 20. It will appear that the initial washing process results in the production of a relatively weak acid, say of 30 to 40% strength, which is conducted into the weak-acid storage tank, and as the flow at this point becomes more and more dilute, the washing liquid may be diverted to waste through the outlet 22, the weak acid being recircuited as will hereinafter appear.

Following the washing pocess, which if desired may be finished by employing an alkaline wash, the precipitated sulphate is conducted to a filter or centrifuge for the removal of a further portion of the accompanying water.

It has been found that the process of filtration is greatly expedited by the addition, say of 2% by volume, of denatured alcohol to the precipitate. This expedient greatly reduces the time required for filtration and substantially expedites the drying of the precipitate. The addition of alcohol to the precipitate offers a further advantage in that any remaining small amount of sulphuric acid is thereby converted into ethyl sulphate which may be readily removed during the drying process hereinafter referred to. The alcohol may be introduced as from a valve-controlled container 23, the liquid resulting from the filtration being delivered from a valved outlet 24, after which the alcohol may be recovered for re-use with no serious loss. It will, of course, be understood that the use of alcohol is not essential to the steps outlined, and that if desired, a relatively larger amount of alcohol may be employed.

Following the filtration treatment the precipitate is conducted to a drier of any suitable form, thence to a disintegrator, and thereafter to a storage container for the finished product.

Proceeding now to a more detailed description of the acid circuit, it may be noted that movement of the liquid from the weak acid storage may be effected, as by means of an acid pump 25, to an evaporator, which may be of steam jacketed type, and as indicated, heated from the boiler or generator employed in supplying the steam jackets of the digester. From the evaporator or concentrator the acid is delivered to the strong-acid storage tank, where it is available, as heretofore described, to be supplied to an incoming charge of crude barytes in the digesters.

It is regarded as effecting certain economies, as well as to reduce the heat of solution incident to the dilution of the strong acid in the precipitators, to employ for the dilution of this acid, instead of pure water, the acid from the weak acid storage container. This practice minimizes the amount of acid to be returned regularly to the evaporator, and also tends to minimize heat loss in the precipitators.

While the chemical processes involved in the several steps of the described method, are thought, from the description of steps involved, to be apparent to those skilled in the art it may be here noted as my thought that the reactions, first of the strong sulphuric acid on the mineral barytes, and later the reaction of the water or weak acid on the sulphate-acid solution, is due to the fact that, bringing together the barytes and sulphuric acid results in a baritic and sulphuric acid solution. This reaction is regarded as reversible according to conditions, and is thought to be fairly indicated by the following:

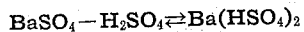

$$BaSO_4 + H_2SO_4 \rightleftarrows Ba(HSO_4)_2$$

In the foregoing equation the action of the strong acid on the mineral is shown as following the uppermost arrow, the reaction proceeding in the opposite direction when the baritic-sulphuric acid solution is diluted, either with water or with weak acid.

It will appear from the foregoing that a great proportion of the sulphuric acid employed, is not lost in the process, the only substantial chemical losses incurred being those resulting from the action of the acid on certain impurities, for example alumina and iron, together with the small loss incurred through the discharge of very weak acid solutions, just ahead of the weak-acid storage tank, through the pipe 22.

While there are certain recorded attempts to produce a pure form of barium sulphate through the precipitation thereof from a sulphuric acid solution, no such processes have, within my knowledge, met with commercial success, due to the fact that a substantial amount of the objectionable impurities are also carried through and precipitated with the sulphate. This has been avoided according to the present process by a distinct filtration process, by careful temperature control and by introducing dry hydrochloric acid through the mixture in the digesters as heretofore described. This result may also be obtained in a lesser measure by the addition of concentrated hydrochloric acid solution under agitation, to the mixture in the digesters. I have found, however, that impurities, like iron salts and calcium salts, which usually exist in the crude barytes, will be very much more completely dissolved by the introduction of hydrochloric acid in vapor form.

A further element of importance in this connection consists in the improvement of the physical qualities of the precipitated sulphate. I have observed that if HCl is not introduced during the process of dissolving the barytes the precipitated sulphate ccoludes a great deal more of the impurities than is the case when HCl is applied according to the method described. In the absence of application of the hydrochloric acid, the precipitate is of such a nature that it is very difficult to separate it by filtration, whereas, following the introduction of the hydrochloric acid to the process, the filtration takes place very much more readily. My preference is to introduce the HCl, as above stated, in the form of a vapor preferably at the lower portion of the digester or agitating containers in such a manner that the vapor bubbles up through the mixture or liquid therein.

The maintenance during initial solution, of a temperature of an order substantially above the boiling point of water serves, besides increasing the solubility of the barytes in the acid, also to prevent dilution of the sulphuric acid by any water carried over by the HCl vapor, or by any water which may be, and usually is, introduced with the crude barytes.

It will appear from the foregoing that the described process, including as it does, facilities for recovering substantially all, say 95%, of the sulphuric acid, and utilizing the HCl vapor in a closed circulating system with the effect of removing substantially all of the impurities and improving the character of the precipitate, results in a practically complete fulfillment of the several objects above set forth.

While the process of my invention has been described in detail in connection with the production of substantially pure barium sulphate, it will be understood that a number of the same principles may be employed, with or without minor modifications of the steps set forth, in the production of other precipitated inorganic substances, and that, therefore, the preceding description is to be understood solely in an illustrative sense, and is not to be limited in intendment and scope except by the claims hereunto appended.

I claim as my invention:

1. The process of purifying a mineral substance of the alkaline-earth group, which consists in subjecting said substance, in a closed container, to the action of concentrated sulphuric acid to cause a solution of the substance, circulating hydrochloric acid through the sulphuric acid and substance to be dissolved, effecting such circulation in a closed circuit including the said container, maintaining the temperature of said container to at least the boiling point of water, filtering the treated solution of the said substance, and diluting the treated solution for precipitating said substance, such dilution being effected to an extent less than required to effect complete precipitation of the mineral to be recovered.

2. The process of preparing a purified alkaline earth salt by precipitation, which consists in subjecting said substance to the action of concentrated sulphuric acid, in a closed container, to bring the substance into solution, circulating hydrochloric acid as a vapor or gas in a closed circuit including said container, filtering the treated solution, diluting the treated solution for precipitating said substance, and concentrating the solvent acid and returning same to said treating container.

3. The process of purifying barium sulphate, which consists in dissolving mineral barytes under the action of sulphuric acid of at least 96% strength, circulating hydrochloric acid through the sulphuric acid and barytes, and diluting the solution to precipitate the barium sulphate.

4. The process of manufacturing precipitated barium sulphate, which consists in dissolving a crude barium-containing mineral in sulphuric acid of at least ninety-five percent strength, introducing hydrochloric acid to the concentrated sulphuric acid and mineral, and diluting the solution to precipitate the barium sulphate.

5. In a process for purifying barium sulphate by precipitation thereof from a sulphuric acid solution, the step preliminary to such precipitation which consists in dissolving a crude barium-containing mineral by subjection thereof to concentrated sulphuric acid, of at least 96% strength, and hydrochloric acid, at a temperature in excess of the boiling point of water, and under the influence of agitation.

6. The process of dissolving a crude alkaline-earth salt for purification by precipitation, which consists in agitating the crude salt in a container heated to a temperature above the boiling point of water in the presence of concentrated sulphuric acid, continuing the agitation for a time, and utilizing the acid in an amount, substantially to dissolve the crude salt, and during agitation, subjecting the crude substance to the action of hydrochloric acid vapor.

7. The step in a process of purifying an alkaline-earth salt by precipitation from concentrated sulphuric acid, by dilution, which consists in diluting the concentrated acid by adding thereto a solution of a chlorine-containing volatile substance.

8. The step in a process of purifying a mineral by diluting a concentrated sulphuric acid solution thereof to cause precipitation of the mineral, which consists in employing a chlorine solution as a diluent.

9. The process of purifying barium sulphate which consists in subjecting a barium-containing mineral to the action of sulphuric acid of at least 96% strength, circulating chlorine gas through the acid and mineral, and diluting the solution to precipitate the mineral from said solution.

10. A step in the process for purifying an alkaline-earth salt by precipitation thereof, which consists in diluting a sulphuric acid solution of such substance to effect precipitation thereof, and in controlling the particle size of the precipitated material by varying the rate of addition of a diluent to the acid-mineral solution, increasing the rate of introduction of the diluent to produce a precipitated material of greater average particle size.

11. The process of purifying barium sulphate which includes precipitation thereof by diluting a sulphuric acid solution of a barium-containing mineral, effecting such dilution by the addition of an acid solution and controlling the particle size of the precipitated substance by varying the concentration of the diluent, employing a diluent of lesser strength to obtain precipitate of greater average particle size.

12. The process of producing precipitated barium sulphate, which consists in introducing a crude barium-containing mineral, in comminuted form, to a closed container, digesting the mineral in said container with sulphuric acid of at least 96% strength, and, during agitation, passing hydrochloric acid vapor through the sulphuric acid for a length of time necessary to bring the mineral substance into solution, removing the solution from said container and mechanically separating solid particles therefrom, transferring the solution to a third container and diluting it in such container to cause precipitation of its barium content, as sulphate, washing the precipitated sulphate, and filtering the washed sulphate.

13. The process of manufacturing precipitated barium sulphate, which consists in digesting a crude barium-containing mineral, with sulphuric acid of at least 96% strength, in a closed, container, at a temperature substantially exceeding the boiling point of water, and during such digestion passing hydrochloric acid vapor through the solution, reducing the temperature of the solution to substantially the boiling point of water, and, while maintaining the solution substantially at this temperature, filtering the solution, removing the solution to a precipitating container and diluting it to an extent to cause precipitation only of the barium, as sulphate, and washing and drying the precipitated sulphate.

14. The process of manufacturing barium sulphate in pure form, which consists in introducing barytes of even, small particle size, to a container, treating the barytes in said container with sulphuric acid of a strength above ninety-six per cent; during the acid treatment agitating the contents of the container and passing therethrough a stream of hydrochloric acid vapor; maintaining said container at a temperature substantially in excess of the boiling point of water, whereby to dissolve the barytes and accompanying impurities; transferring the solution to a filtering container; reducing the temperature of the solution in said filtering container to substantially the boiling point of water; removing the filtered solution to a precipitating container; diluting the solution in the precipitating container, only to an extent sufficient to precipitate a portion of its barium content, as sulphate; removing the diluted solvent acid from the precipitating container; concentrating such acid and returning same for the treatment of subsequent incoming quantities of barytes; removing the precipitated barytes from the container therefor, washing the precipitated barytes to remove free acid therefrom, filtering the precipitated sulphate, and drying the sulphate for storage.

ALEXANDER L. DUVAL d'ADRIAN.